(12) United States Patent
Riou et al.

(10) Patent No.: US 10,288,516 B2
(45) Date of Patent: May 14, 2019

(54) DEVICE FOR DETECTING MECHANICAL DECOUPLING PRESSURE

(71) Applicant: SAFRAN ELECTRONICS & DEFENSE, Boulogne Billancourt (FR)

(72) Inventors: Jean-Christophe Riou, Boulogne Billancourt (FR); Eric Bailly, Boulogne Billancourt (FR)

(73) Assignee: SAFRAN ELECTRONICS & DEFENSE, Boulogne-Billancourt (FR)

( * ) Notice: Subject to any disclaimer, the term of this patent is extended or adjusted under 35 U.S.C. 154(b) by 0 days.

(21) Appl. No.: 15/735,400

(22) PCT Filed: Jun. 7, 2016

(86) PCT No.: PCT/EP2016/062923
§ 371 (c)(1),
(2) Date: Dec. 11, 2017

(87) PCT Pub. No.: WO2016/198414
PCT Pub. Date: Dec. 15, 2016

(65) Prior Publication Data
US 2018/0172539 A1 Jun. 21, 2018

(30) Foreign Application Priority Data

Jun. 12, 2015 (FR) ...................................... 15 55411

(51) Int. Cl.
*G01L 7/08* (2006.01)
*G01C 21/00* (2006.01)
(Continued)

(52) U.S. Cl.
CPC ............ *G01L 19/146* (2013.01); *G01L 7/082* (2013.01); *G01L 19/0681* (2013.01); *G01L 19/147* (2013.01)

(58) Field of Classification Search
CPC ... G01L 19/146; G01L 7/082; G01L 19/0681; G01L 19/147; G01L 9/0022; G01L 9/0019
See application file for complete search history.

(56) References Cited

U.S. PATENT DOCUMENTS

| | | | | |
|---|---|---|---|---|
| 5,090,247 A | * | 2/1992 | Liebgen | G01L 9/0042 338/4 |
| 5,257,546 A | * | 11/1993 | Tobita | G01L 19/146 338/4 |

(Continued)

*Primary Examiner* — Harshad R Patel
*Assistant Examiner* — Brandi N Hopkins
(74) *Attorney, Agent, or Firm* — Muncy, Geissler, Olds & Lowe, PC

(57) ABSTRACT

A pressure detection device including a mount whereon a pressure sensor is attached which comprises a membrane which has a surface intended to be subjected to a pressurized fluid and which is so arranged as to elastically deform according to pressure, and means for determining the deformation of the membrane along an axis normal to a mid-plane of the membrane in the rest state. The membrane is supported by a frame connected to the mount by a mechanical decoupling structure in order to isolate the membrane from stress resulting from a differential thermal expansion between the frame and the mount, with the membrane and the frame being made of the same material.

5 Claims, 2 Drawing Sheets

(51) Int. Cl.
*G01L 9/00* (2006.01)
*G01L 19/14* (2006.01)
*G01L 19/06* (2006.01)

(56) References Cited

U.S. PATENT DOCUMENTS

| | | | |
|---|---|---|---|
| 5,317,917 A | 6/1994 | Dufour | |
| 5,509,312 A * | 4/1996 | Donzier | G01L 19/0609 73/152.52 |
| 2007/0277616 A1 | 12/2007 | Nikkel et al. | |
| 2008/0264172 A1* | 10/2008 | Sakurai | G01L 9/0016 73/726 |
| 2010/0095778 A1* | 4/2010 | Sato | G01L 9/0022 73/756 |
| 2015/0090041 A1 | 4/2015 | Imai | |

* cited by examiner

DEVICE FOR DETECTING MECHANICAL DECOUPLING PRESSURE

The present invention relates to the field of pressure measurement, specifically in the field of aeronautics.

STATE OF THE ART

A pressure detection device comprises a mount whereon a pressure sensor is attached. The pressure sensor comprises a substrate supporting a first electrode and a membrane which supports a second electrode opposite the first electrode. The membrane is subjected to the pressure of the fluid to be measured, and is liable to deform under such pressure, so that the distance between the electrodes, measured along an axis normal to the electrodes varies according to pressure. As they are subjected to electric voltage, both electrodes thus form a capacitor, the capacity of which varies according to pressure, with the measurement of such capacity making it possible to determine pressure.

Other devices including other means for measuring the deformation of the membrane also exist, such as strain gages, for instance.

One drawback of such devices as a whole is that the accuracy thereof depends on temperature and the variations thereof.

As a matter of fact, as the membrane and the substrate are generally made of different materials, the variations in temperature cause, in the device, differential expansions which result in stress affecting the deformation of the membrane and thus bias the pressure measurement.

SUBJECT OF THE INVENTION

One aim of the invention is to supply means for improving the accuracy of the sensors.

BRIEF SUMMARY OF THE INVENTION

For this purpose, a pressure detection device is provided, which comprises a mount whereon a pressure sensor is attached which comprises a membrane which has a surface intended to be subjected to a pressurized fluid and which is so arranged as to elastically deform according to pressure, and means for determining the deformation of the membrane along an axis normal to a mid-plane of the membrane at rest. The membrane is supported by a frame connected to the mount by a mechanical decoupling structure in order to isolate the membrane from stress resulting from a differential thermal expansion between the frame and the mount. The decoupling structure comprises a plate integral with the frame and elastically deformable arms extending between the plate and the mount so as to transform any differential thermal expansion between the mount and the plate into a resulting movement parallel to the mid-plane. The plate, the membrane and the frame are made of the same material, and the arms have a curved portion, with the curved portions being curved in the same direction so that the resulting movement is a rotation around the normal axis.

The mechanical decoupling structure makes it possible to prevent the differential thermal expansions to affect the behaviour of the membrane, or at least limit the effect of the differential thermal expansions on the behaviour of the membrane.

The elasticity of the arms favours the transformation of the thermal stress inside the sensor into a rotating movement on the plate supporting the sensor. The curved portion of the arms, at the plate, makes it possible to add flexibility and to homogenize the thermal stress which the arms are subject to. The arms being curved in the same direction symmetrizes the stress transmitted between the arms on the plate and still enhances the transformation of the internal thermal stress into a rotation movement in the plane of the plate supporting the sensor. Such a movement thus causes no parasitic deflection of the membrane and makes the pressure measurement more reliable.

According to a particularly advantageous solution of the invention, the pressure detection device includes a mount whereon a pressure sensor is attached which comprises a membrane which has a surface intended to be subjected to a pressurized fluid and which is so arranged as to elastically deform according to pressure, and means for determining the deformation of the membrane along an axis normal to a mid-plane of the membrane in the rest state. In this solution, the membrane is supported by a frame connected to the mount by a mechanical decoupling structure in order to isolate the membrane from stress resulting from a differential thermal expansion between the frame and the mount, and the decoupling structure comprises a plate integral with the frame and elastically deformable arms which extend between the plate and the mount, so as to transform any differential thermal expansion between the mount and the plate into a resulting movement parallel to the mid-plane. The plate, the membrane and the frame are made of the same material, and the mechanical decoupling structure comprises an intermediate frame and the arms comprise a first series of substantially mutually parallel arms connecting the plate to the intermediate frame and a second series of arms which are substantially perpendicular to the arms of the first series and which extend between the intermediate frame and the mount. The arms make it possible to transform any differential thermal expansion between the plate and the mount into the translation of the plate in a plane perpendicular to the normal axis which causes no parasitic stress on the membrane liable to affect the pressure measurement.

According to another alternative solution of the invention, the pressure detection device includes a mount whereon a pressure sensor is attached which comprises a membrane which has a surface intended to be subjected to a pressurized fluid and which is so arranged as to elastically deform according to pressure, and means for determining the deformation of the membrane along an axis normal to a mid-plane of the membrane in the rest state. According to the invention, the membrane is supported by a frame connected to the mount by a mechanical decoupling structure in order to isolate the membrane from stress resulting from a differential thermal expansion between the frame and the mount. The decoupling structure comprises a connection of the frame with the mount on one side only, with the membrane and the frame being made of the same material, and with the connection being so arranged that the frame extends in a cantilevered position relative to the mount. Such decoupling method is more particularly adapted to sensitive elements made of silicon, and of silicon alloy (silicon carbide, silicon nitride), of quartz («silica fuse»), and of diamond, too. Such structure can easily be machined using mechanical or wet or dry chemical methods. The deflections connected with the decoupling are located in a very slim portion of the connection.

Other characteristics and advantages of the invention will become apparent upon reading the following description of particular non-restrictive embodiments of the invention.

BRIEF DESCRIPTION OF THE FIGURES

Reference is made to the appended drawings, wherein.

DETAILED DESCRIPTION OF THE INVENTION

Figure 1:
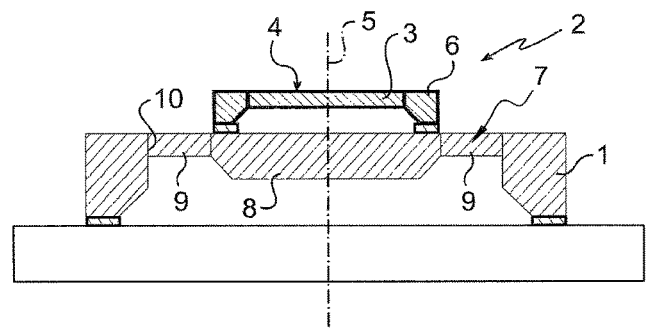
FIG. 1 is a schematic cross-sectional view of a device according to a first embodiment of the invention.

Referring to the figures, the pressure detection device comprises a mount 1 whereon a pressure sensor is attached, which generally bears reference number 2. The pressure sensor 2 comprises a membrane 3 which has a surface 4 intended to be subjected to a pressurized fluid and which is so arranged as to elastically deform according to pressure. The pressure sensor 2 further comprises means for determining the deformation of the membrane 3 along an axis 5 normal to a mid-plane of the membrane 3 at rest.

According to the invention, the membrane 3 is supported by a frame 6 made of the same material as the membrane 3. The frame 6 is supported by a mechanical decoupling structure, generally bearing reference number 7, connected to the mount 1 and so arranged as to isolate the membrane 3 from stress resulting from a differential thermal expansion between the frame 6 and the mount 1.

Figure 2:
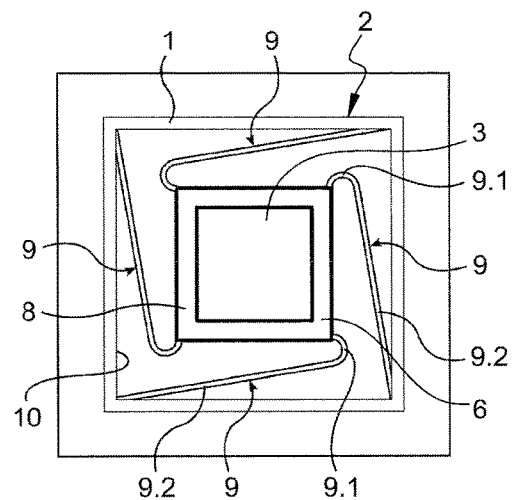
FIG. 2 is a schematic top view of a device according to a first embodiment of the invention.
Figure 3:
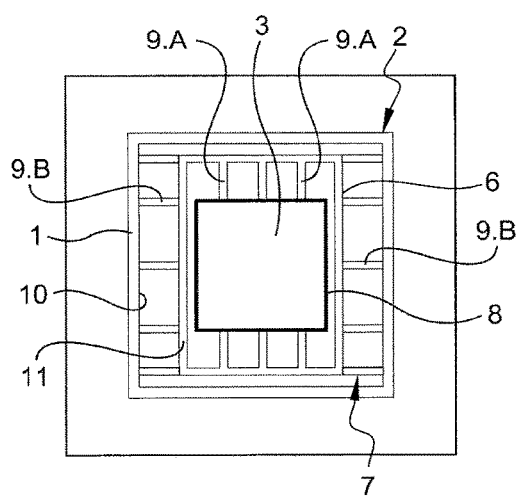
FIG. 3 is a top view of a device according to an alternative solution for the first embodiment of the invention.

According to a first embodiment shown in FIGS. 1 to 3, the decoupling structure 7 comprises a plate 8 integral with the frame 6 and arms 9 extending between the plate 8 and the mount 1. The plate 8, the membrane 3 and the frame 6 are made of the same material. The arms 9 are elastically deformable so as to transform any differential thermal expansion between the mount 1 and the plate 8 into a resulting movement parallel to the mid-plane.

More precisely here, the plate 8 has a substantially rectangular perimeter and is accommodated in a recess 10 of the mount 1 having a rectangular perimeter, with the arms 9 connecting the perimeter of the plate 8 with the wall of the recess 10.

Referring to FIG. 2, the arms 9 have a curved portion 9.1 connected with the plate 8 and a straight portion 9.2 connected with the mount 1.

The curved portions 9.1 are curved in the same direction. The curved portion 9.1 of each arm 9 is integral with the plate 8 in the vicinity of one of the corners of the plate 8.

Each straight portion 9.2 extends in a direction which is included in a plane parallel to the membrane 3 at rest, but which is not intersecting the normal axis 5. The straight portion 9.2 of each arm 9 is integral with the mount 1 in the vicinity of one of the corners of the recess 10, with said corner being the corner adjacent the one opposite the corner of the plate 8 which the curved portion 9.1 of the same arm 9 is connected with. The straight portions 9.2 extend symmetrically relative to the normal axis 5.

The arms 9 make it possible to transform any differential thermal expansion between the plate 8 and the mount 1 into a resulting movement consisting in a rotation around the normal axis 5.

In the first embodiment, the determination means, known per se, comprise for instance a first electrode integral with the plate 8 and a second electrode supported by the membrane 3 opposite the first electrode. Thus, when the membrane 3 is subjected to the pressure of the fluid to be measured, it deforms under such pressure, so that the distance between the electrodes, measured along the axis 5 varies according to pressure. As they are subjected to electric voltage, both electrodes thus form a capacitor, the capacity of which varies according to pressure, with the measurement of such capacity making it possible to determine pressure. For this purpose, the electrodes are connected to a control unit, known per se, and not shown here, through wires, the length and the flexibility of which are sufficient not to hinder the movements of the plate 8.

In the alternative solution shown in FIG. 3, the decoupling structure 7 comprises an intermediate frame 11 and the arms 9 are straight and include a first series of arms 9.A substantially mutually parallel and connecting the plate 8 with the intermediate frame 11 and a second series of arms 9.B which are substantially perpendicular to the arms 9.A of the first series and which extend between the intermediate frame 11 and the mount 1.

The arms 9.A, 9.B make it possible to transform any differential thermal expansion between the plate 8 and the mount 1 into the translation of the plate 8 in a plane perpendicular to the axis 5.

Figure 4:
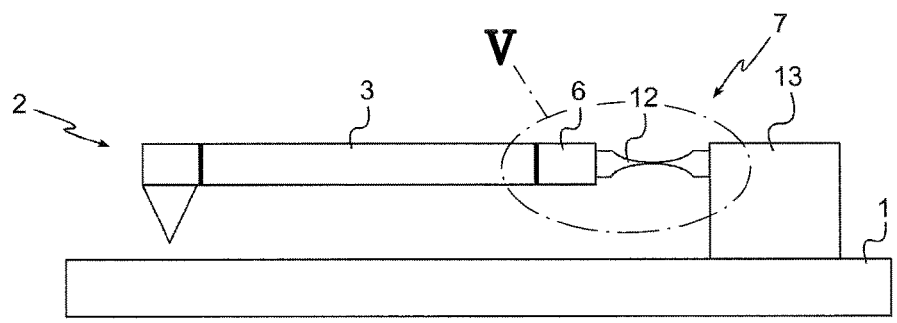
FIG. 4 is a schematic cross-sectional view of a device according to a second embodiment of the invention.
Figure 5:
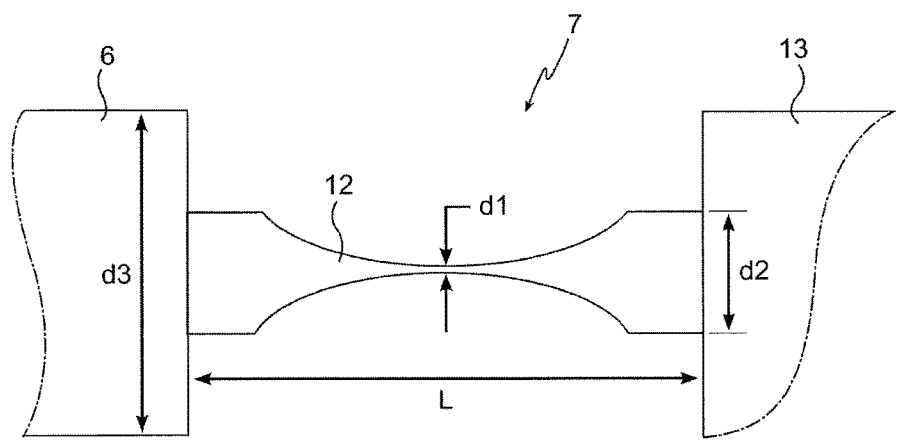
FIG. 5 is a partial detailed view of zone V of FIG. 4.

The elements identical with or similar to those previously described will bear reference numbers identical therewith in the following description of a second embodiment relating to FIG. 4.

In this embodiment, the decoupling structure 7 comprises a block 13 integral with the mount 1 and connected through a connection 12 to one side only of the frame 6, with the connection being so arranged that the frame extends in a cantilevered position relative to the mount 1.

The device is so arranged that the assembly consisting of the elements 2, 3, 6, 7 is made of materials having the same nature as the sensitive element, so as not to introduce any difference in the expansion between the sensitive element and the decoupling structure 7. The sensitive element can thus be assembled onto the decoupling structure 7 in a completely rigid way.

Such decoupling method is more particularly adapted to sensitive elements made of silicon, and of silicon alloy (silicon carbide, silicon nitride), of quartz («silica fuse»), and of diamond, too. Such structure can easily be machined using mechanical or wet or dry chemical methods.

The deflections connected with the decoupling are located in a very slim portion of the connection 12 in the vicinity of the assembly 2, 3, 6, 7 which is, by comparison, infinitely rigid during a thermal cycling and/or vibrations.

With given thickness and length L of the connection 12 (the length L is measured along the connection 12 between the block 13 and the frame 6), the efficiency of decoupling (acceptable deformation of the elements 3, 6 assembly vs the performance of the sensor) depends on the d2/d1 and d3/d1 ratios where: d1 is the minimum thickness of the connection 12 (the most flexible area), d2 is the maximum thickness of the connection 12 at the coupling thereof with the block 7 and d3 is the thickness of the frame 6. In any case, such ratios preferably range from 10 to 100 so that the remaining stress applied to the sensitive element in spite of the deformation of the connection 12 can be accepted, considering the expected performances. Increasing the length or reducing the thickness of the connection 12 make it possible to improve the efficiency of the decoupling again.

The sensitive element may comprise a pressure-sensitive membrane and a rear cavity to enclose a reference pressure which may be vacuum.

The determination means, known per se, then comprise strain gages attached to the membrane 3 in order to measure the deformation thereof. The strain gages are connected to a control unit, not shown here, through wires, the length and the flexibility of which are sufficient not to hinder the movements of the frame 6.

Of course, the invention is not limited to the described embodiments but encompasses any alternative solution within the scope of the invention as defined in the claims.

The device may specifically have other shapes than the one described above. The membrane may for instance have a circular shape.

The invention claimed is:

1. A pressure detection device comprising:
a mount whereon a pressure sensor is attached which comprises a membrane which has a surface intended to be subjected to a pressurized fluid and which is so arranged as to elastically deform according to pressure, and
means for determining the deformation of the membrane along an axis normal to a mid-plane of the membrane at rest,
wherein the membrane is supported by a frame connected to the mount by a mechanical decoupling structure in order to isolate the membrane from stress resulting from a differential thermal expansion between the frame and the mount, and
wherein the decoupling structure comprises a plate integral with the frame and elastically deformable arms extending between the plate and the mount so as to transform any differential thermal expansion between the mount and the plate into a resulting movement parallel to the mid-plane, with the plate, the membrane and the frame being made of the same material, with the arms having a curved portion, and with the curved portions being curved in the same direction so that the resulting movement is a rotation around the normal axis.

2. A device according to claim 1, wherein the arms have a straight portion extending along a direction not intersecting the normal axis, with the straight portions extending symmetrically relative to the normal axis.

3. A device according to claim 2, wherein the plate has a rectangular perimeter and is accommodated in a recess of the mount having a rectangular perimeter, with the curved portion of each arm being integral with the plate in a vicinity of one of the corners of the plate and the straight portion of each arm being integral with the mount in the vicinity of one of the corners of the recess.

4. A pressure detection device comprising:
a mount whereon a pressure sensor is attached which comprises a membrane which has a surface intended to be subjected to a pressurized fluid and which is so arranged as to elastically deform according to pressure; and
means for determining the deformation of the membrane along an axis normal to a mid-plane of the membrane at rest,
wherein the membrane is supported by a frame connected to the mount by a mechanical decoupling structure in order to isolate the membrane from stress resulting from a differential thermal expansion between the frame and the mount,
wherein the decoupling structure comprises a plate integral with the frame and elastically deformable arms extending between the plate and the mount so as to transform any differential thermal expansion between the mount and the plate into a resulting movement parallel to the mid-plane, with the plate,
wherein the membrane and the frame are made of a same material, and
wherein the mechanical decoupling structure comprises an intermediate frame and the arms comprise a first series of substantially mutually parallel arms connecting the plate to the intermediate frame and a second series of arms which are substantially perpendicular to the arms of the first series and which extend between the intermediate frame and the mount.

5. A pressure detection device comprising:
a mount whereon a pressure sensor is attached which comprises a membrane which has a surface intended to be subjected to a pressurized fluid and which is so arranged as to elastically deform according to pressure; and
means for determining the deformation of the membrane along an axis normal to a mid-plane of the membrane at rest,
wherein the membrane is supported by a frame connected to the mount by a mechanical decoupling structure in order to isolate the membrane from stress resulting from a differential thermal expansion between the frame and the mount, with the membrane and the frame being made of the same material, and
wherein the decoupling structure comprises a connection of the frame with the mount on one side only, with the connection being so arranged that the frame extends in a cantilevered position relative to the mount.

* * * * *